United States Patent [19]
Lam

[11] Patent Number: 5,648,797
[45] Date of Patent: Jul. 15, 1997

[54] TRIGGERING CIRCUIT FOR USE WITH COMPUTER GAME JOYSTICK

[75] Inventor: Hang-Yick Lam, Kowloon, Hong Kong

[73] Assignee: STD Electronic International Ltd, Hong Kong

[21] Appl. No.: 456,910

[22] Filed: May 31, 1995

[51] Int. Cl.[6] .................................................. G06F 3/033
[52] U.S. Cl. ........................ 345/161; 463/36; 463/38; 327/165
[58] Field of Search ........................ 345/161, 163; 463/1, 2, 5, 36, 38, 49, 52, 39; 327/178, 165, 100

[56] References Cited

U.S. PATENT DOCUMENTS

| | | | |
|---|---|---|---|
| 4,306,232 | 12/1981 | Burson | 345/161 |
| 4,444,997 | 4/1984 | Danish et al. | 178/18 |
| 4,686,361 | 8/1987 | Bard | 250/221 |
| 4,864,272 | 9/1989 | Cecchi et al. | 338/128 |
| 4,886,941 | 12/1989 | Davis et al. | 345/163 X |
| 5,409,226 | 4/1995 | Mesko et al. | 463/36 X |
| 5,430,660 | 7/1995 | Lueker et al. | 327/165 X |
| 5,559,432 | 9/1996 | Logue | 345/161 X |

Primary Examiner—Raymond J. Bayerl
Assistant Examiner—Seth D. Vail
Attorney, Agent, or Firm—Samuels, Gauthier Stevens & Reppert

[57] ABSTRACT

Apparatus for generating a pulsed triggering signal for use with a computer game system including a joystick. The apparatus includes a detection unit for detecting a coordinate signal between a joystick output port and a game input port of a computer, and a pulse generation unit for generating a pulsed triggering signal responsive to the detected coordinate signal.

7 Claims, 2 Drawing Sheets

1

TRIGGERING CIRCUIT FOR USE WITH COMPUTER GAME JOYSTICK

BACKGROUND OF THE INVENTION

The invention generally relates to computer game accessories, and particularly relates to joysticks having automatic firing capabilities and being adapted for use with personal computers.

The automatic firing feature of a typical joystick is designed to simulate the rapid actuation of a firing push switch on a joystick by generating a series of electrical pulses that are in communication with the appropriate joystick connector elements of a computer system.

Most joysticks having automatic firing capabilities, however, are not always sufficiently responsive when the automatic firing feature is selected. Sometimes when the function is selected the rate of firing that appears on the computer screen is slow and other times the rate varies considerably, sometimes even while the automatic firing feature is being employed. The result is that the automatic firing feature is often difficult to control and this detracts from the utility of the device and the user's enjoyment of the computer game system generally.

SUMMARY OF THE INVENTION

The invention provides for the generation of a pulsed triggering signal responsive to a coordinate signal of the joystick in communication with a game input port of a computer. In various embodiments the invention includes the monitoring of one or two coordinate signals, e.g., x and y, of the joystick and provides a selection unit for selecting between different triggering signals generated from the coordinate signals.

DETAILED DESCRIPTION OF THE PREFERRED EMBODIMENTS

It has been discovered that although most automatic firing pulse generators of conventional joysticks operate at pulse frequencies of between 35 to 100 pulses per second, the computer system often fails to recognize the alternating firing signal sometimes for significant periods of time. This causes an irregular delay between when the user selects the automatic firing feature and when the computer system responds by indicating a firing sequence on the display.

The delay is principally caused by the fact that the computer system reads the input from the automatic firing output signal on the joystick at a frequency which is generally slower than the frequency of the automatic firing pulse generator. Moreover, this read or input frequency may vary from one computer system to another, and varies from one game program to another and sometimes varies during a game.

For example, most game software is designed to register a fire command when the electrical status of a firing pin changes state and returns to its previous state, e.g., when it changes from a relatively high voltage state, to a low voltage state and then back to the high voltage state. This is designed to simulate the user pressing and releasing the fire push switch.

When the user manually presses and releases the fire push switch the computer system is typically sufficiently responsive to immediately recognize the signal and generate the appropriate firing subroutine for the display. When an automatic firing circuit having a pulse generator is used, however, it sometimes takes the computer system a significant amount of time to recognize the automatic firing command due to the fact that the input signal is read by the computer system continually.

Figure 1:
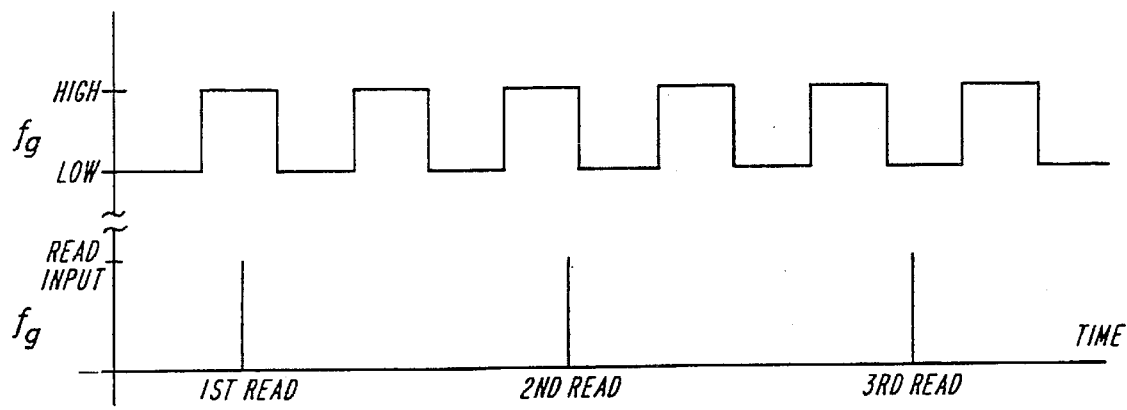
FIG. 1 shows a timing relationship between the electrical pulses generated by a conventional automatic firing pulse generator, and the alternating read (or input) cycles of a conventional computer system.

As shown in FIG. 1, the frequency $f_g$ of the automatic firing pulse generator is greater than the frequency $f_i$ of the game port input of the computer system. During the first read or input pulse of the computer system the status of the firing signal is high, and during the second read pulse the status of the firing signal is still high even though the firing signal itself has changed in the interim. There will therefore be no change in status and the game software will not generate a shot on the screen. During the third read the computer system will register a change in status in the firing signal. A shot, however, will still not be fired until the status of the firing signal is recognized as having returned to its high voltage state. This may require a plurality of further cycles thereby creating a substantial delay. The closer the frequency $f_g$ is to being an integer multiple of the frequency $f_i$, the greater the chance that such delays will be for significantly long periods of time.

Applicant has discovered that the above problem may be remedied by identifying the frequency $f_i$ of each computer system, and automatically and continuously optimizing the frequency of the automatic firing generator circuit for each computer system and game individually. The firing output frequency $f_o$ is optimally integer plus one half multiples of the input read frequency $f_i$. This ensures that the input port of the computer system will recognize the required state changes as soon as possible.

It has further been discovered that although typical computer systems do not provide output signals indicating when the firing input port is being read, such information may be determined from either the x coordinate or y coordinate signal lines of the joystick.

Figure 2:
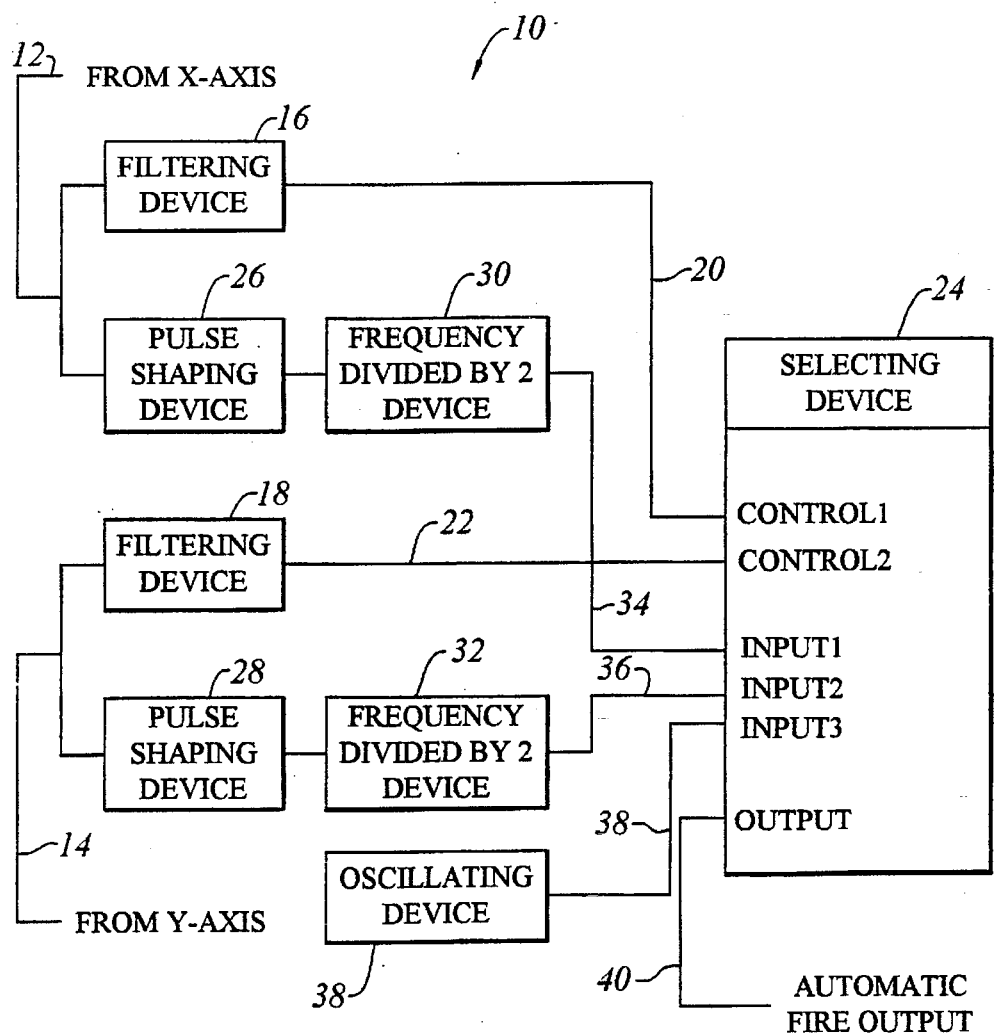
FIG. 2 shows a block diagram of a triggering system of an embodiment of the present invention.

As shown in FIG. 2, in one embodiment of a system 10 of the invention this is achieved by first filtering the signal from either the x coordinate 12 or y coordinate 14 signal lines by either of filters 16 or 18 respectively. The output of each of the filtering devices 16, 18 is in communication with a control line input 20, 22 respectively of a selection device 24.

The coordinate line signals 12, 14 are also in communication with pulse shaping devices 26, 28 respectively. The frequencies of the output signals of the pulse shaping devices 26, 28 are divided by two at frequency dividers 30, 32 prior to the input to first and second input ports 34, 36 of the selection device 24. The selection device 24 also receives a third input signal from an oscillating signal generator 38. The automatic firing output signal is provided at the output port 40 of the selection device 24.

During use, the signal from one of the two coordinate lines 12, 14 of the game port is used to toggle the status of the firing signal by using the pulse shaping devices 26, 28 and frequency dividers 30, 32. Since the status of the firing signal is to be changed every time the computer reads the firing input port, the game software will fire a shot after the computer executes three consecutive reads of the firing input. This is the optimum automatic firing rate for this embodiment.

The oscillating signal generator 38 is employed to avoid loss of automatic firing capabilities in the event that pulses cannot be generated from either the x-coordinate or y-coordinate signal lines. This may, for example, be needed if the present position of the joystick cursor does not permit the appropriate information to be determined from the x and y coordinate lines, such as may be the case if the joystick cursor is in the top left corner of the screen.

Figure 3:
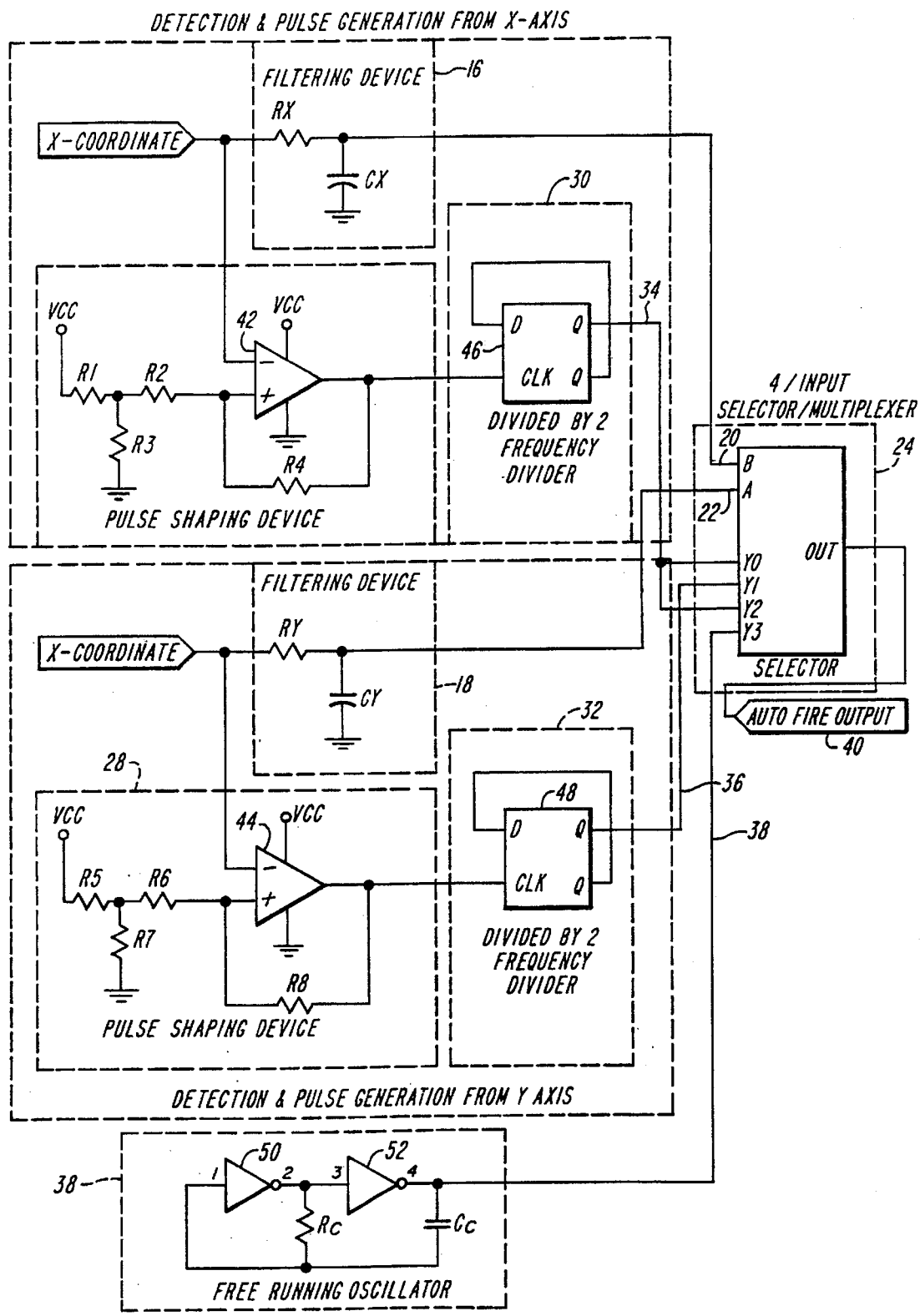
FIG. 3 shows an electrical circuit for carrying out the functions of the triggering system shown in FIG. 2.

As shown in FIG. 3, in one embodiment the filtering devices 16, 18 each comprise an in-line resistor and a capacitor to ground ($R_x$, $C_x$, and $R_y$, $C_y$ respectively) which provide low pass filters having a time constant of about 47 milliseconds. The filtered signals are used to indicate the validity of the coordinate signal lines 12, 14 to be used to generate pulses in synchronization with the computer. A relatively high voltage level of a filtered signal indicates that pulses cannot be generated from a particular coordinate signal line, while a low voltage level indicates that pulses can be generated from that particular coordinate signal line. In various embodiments, either of the coordinate signal lines may be monitored individually or both may be monitored as shown.

The pulse shaping devices each include an operational amplifier 42, 44 and four resistors $R_1$–$R_4$ and $R_5$–$R_8$ respectively as shown in FIG. 3. Each operational amplifier 42, 44 is configured as a comparator that functions as a hysteresis. Specifically, and with reference to the x-coordinate system, when the voltage of the x-coordinate line, $V_x$, is higher than that of the negative input of the operational amplifier 42, V−, the output of the operational amplifier 42 will be logically high. When the voltage $V_x$ is lower than V−, then the output of the operational amplifier 42 will be logically low. This operation will generate a pulse to the frequency divider 30 which comprises a D-type flip flop element 46. This pulse serves two purposes, the first of which is to indicate that the computer is reading the game port, and the second is to clock or trigger the CLK input of the D-type flip flop 46. This will in turn toggle the logical state of the output of the D-type flip flop 46. Every time, therefore, that the computer reads the x-coordinate game port the Q output will change its current logical state from high to low or vice versa. The Q output may be used to provide the automatic firing output signal. The y coordinate monitoring circuit includes a D-type flip flop 48 that functions similar to D-type flip flop 46 of the x-coordinate monitoring circuit.

If both the x and y coordinate monitoring circuits are employed, then the output from the x coordinate line is used when the x coordinate line is valid (high). When the x coordinate line is not valid (low) then the output from the y coordinate line is used if it is valid (high). Otherwise, the output signal from the oscillating device 38 is used. The oscillating device includes two inverters 50, 52, a resistor $R_c$ and a capacitor $C_c$ as shown in FIG. 3.

Those skilled in the art will appreciate that numerous modifications and variations may be made to the above disclosed embodiments without departing from the spirit and scope of the invention.

What is claimed is:

1. Apparatus for generating a pulsed triggering signal for use with a computer game system including a joystick, said apparatus comprising detection means for detecting a coordinate signal between a joystick output port and a game input port of a computer, and pulse generation means for generating a pulsed triggering signal responsive to said detected coordinate signal.

2. An apparatus as claimed in claim 1, wherein said pulse generation means includes pulse shaping means for generating a pulsed signal responsive to said coordinate signal, and frequency divider means for dividing the frequency of said generated pulsed signal and for producing said pulsed triggering signal.

3. An apparatus as claimed in claim 1, wherein said apparatus further includes filtering means for filtering said coordinate signal and producing a coordinate activity indicator signal representative of whether the coordinate signal is active.

4. An apparatus as claimed in claim 3, wherein said apparatus further includes supplemental oscillator means for providing an oscillating signal.

5. An apparatus as claimed in claim 3, wherein said apparatus further includes selection means for selecting either said pulsed triggering signal or said oscillating signal as the pulsed triggering signal responsive to said coordinate activity indicator signal.

6. An apparatus as claimed in claim 1, wherein said apparatus further includes a plurality of detection means for detecting a plurality of coordinate signals between a joystick output port and a game input port of a computer, and a plurality of pulse generation means for generating a plurality of pulsed triggering signals responsive to said detected coordinate signals.

7. An apparatus as claimed in claim 6, wherein said apparatus further includes selection means for selecting between said plurality of pulsed triggering signals responsive to said coordinate signals.

* * * * *